(12) United States Patent
Fuhrmann

(10) Patent No.: US 6,935,033 B2
(45) Date of Patent: Aug. 30, 2005

(54) MEASURING INSTRUMENT FOR ESTABLISHING THE ANGLE OF TILT OF A LENS MOUNTING RIM OF A SPECTACLES FRAME

(75) Inventor: Jörg Fuhrmann, Altusried (DE)

(73) Assignee: Rodenstock GmbH (DE)

( * ) Notice: Subject to any disclaimer, the term of this patent is extended or adjusted under 35 U.S.C. 154(b) by 25 days.

(21) Appl. No.: 10/376,844

(22) Filed: Feb. 28, 2003

(65) Prior Publication Data
US 2003/0226267 A1 Dec. 11, 2003

Related U.S. Application Data

(63) Continuation-in-part of application No. 10/032,954, filed on Dec. 28, 2001, now abandoned, which is a continuation of application No. PCT/DE01/01606, filed on Apr. 30, 2001.

(30) Foreign Application Priority Data

Apr. 28, 2000 (DE) .......................... 100 20 844

(51) Int. Cl.[7] ................................ A61B 3/10
(52) U.S. Cl. .............................. 33/200; 33/507; 33/28; 33/471; 33/488
(58) Field of Search .......................... 33/200, 507, 28, 33/465, 471, 488

(56) References Cited

U.S. PATENT DOCUMENTS

| | | |
|---|---|---|
| 1,384,872 A | 7/1921 | Stevens |
| 1,484,366 A | 2/1924 | Uhlemann |
| 4,177,571 A | 12/1979 | Renier ......................... 33/200 |
| 4,252,419 A * | 2/1981 | Padula et al. .................. 33/200 |
| 4,625,418 A * | 12/1986 | Joncour et al. ................ 33/200 |
| 5,117,560 A * | 6/1992 | Nevins ......................... 33/471 |
| 5,175,941 A * | 1/1993 | Ziegler et al. ................ 33/810 |
| 5,189,804 A | 3/1993 | Ostachowski et al. ........ 33/471 |
| 5,400,522 A * | 3/1995 | Kremer et al. ................ 33/810 |
| 5,732,474 A | 3/1998 | Cannon ....................... 33/452 |
| 6,001,082 A * | 12/1999 | Dair et al. ................... 604/207 |
| 6,115,926 A | 9/2000 | Robell .......................... 33/1 |

FOREIGN PATENT DOCUMENTS

| | | |
|---|---|---|
| DE | 30 13 960 | 10/1981 |
| FR | 2 384 232 | 9/1979 |
| GB | 2 240 405 | 7/1991 |
| WO | PCT/DE01/01606 | 4/2000 |

OTHER PUBLICATIONS

Johannes Eber, Anatomische Brillenanpassung Sonderdruck einer Fortsetzungsserie aus "Deutsche Optikerzeitung" 1987, 19 Pages.

* cited by examiner

Primary Examiner—Diego Gutierrez
Assistant Examiner—Yaritza Guadalupe
(74) Attorney, Agent, or Firm—St. Onge Steward Johnston & Reens LLC

(57) ABSTRACT

A measurement instrument for establishing an angle by which each lens-mounting rim of a spectacles frame having two lens-mounting rims joined by a spectacles bridge is tilted in a horizontal plane in front of an eye of a spectacles wearer comprises a supporting plate onto which a spectacles frame can be positioned with the upper or lower outside edges of the lens-mounting rims downward; a marking line on the surface of the supporting plate for alignment of the spectacles frame; and at least one adjustable means permitting measurement of an angle between an imaginary line connecting a nasal and a temporary edge of a lens-mounting rim and the marking line.

8 Claims, 3 Drawing Sheets

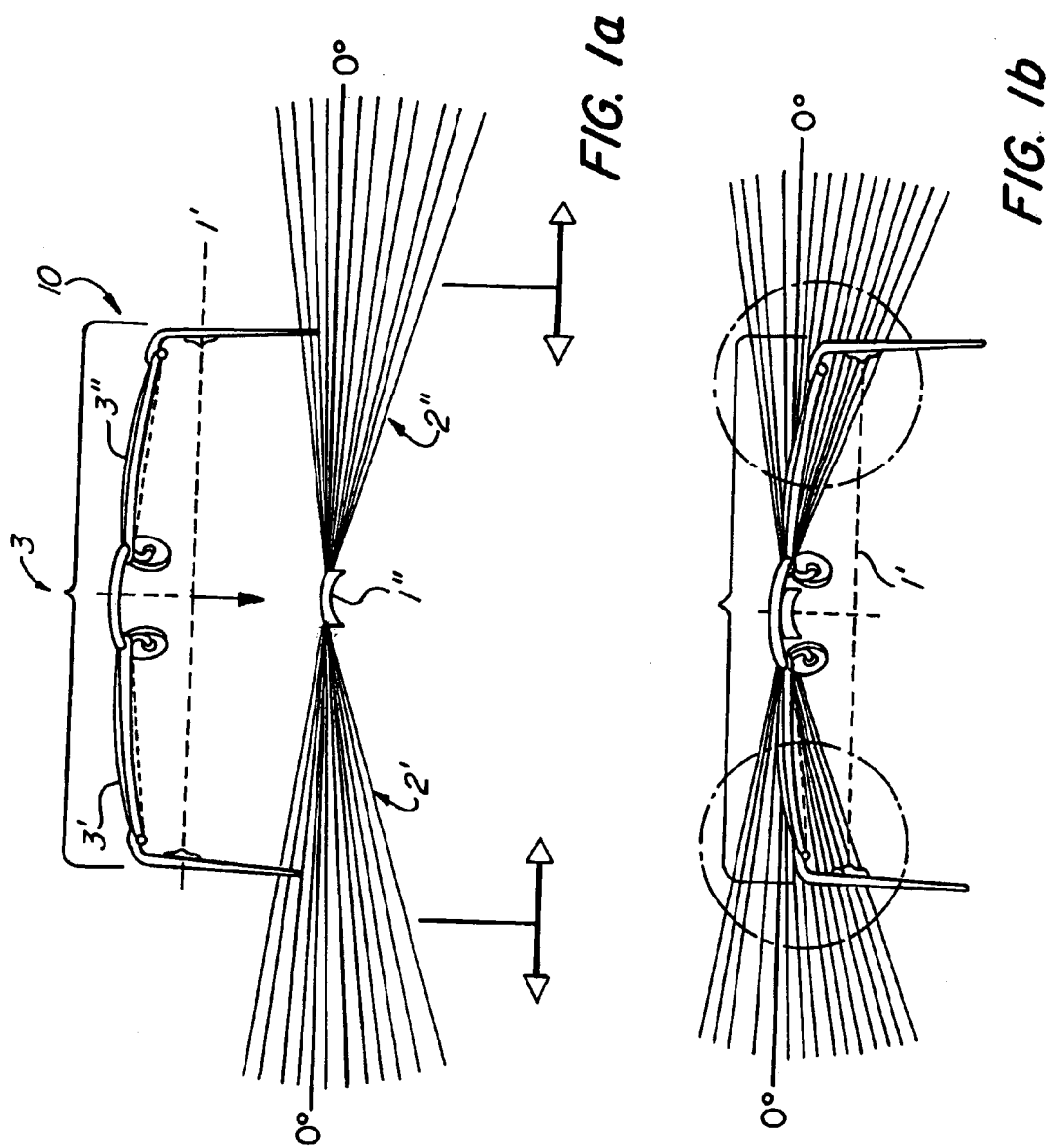

MEASURING INSTRUMENT FOR ESTABLISHING THE ANGLE OF TILT OF A LENS MOUNTING RIM OF A SPECTACLES FRAME

CROSS-REFERENCE TO RELATED APPLICATIONS

This is a continuation-in-part of U.S. patent application Ser. No. 10/032,954, filed Dec. 28, 2001 now abandoned which is a continuation of PCT/DE01/01606 filed Apr. 30 2001.

FIELD OF THE INVENTION

The present invention relates to a measuring instrument for establishing the angle of tilt of a lens mounting rim of a spectacles frame.

Owing to the advances of computer technology and the development of automatic optimizing programs for progressive power spectacles lenses, and in view of the development of highly flexible, numerically controlled grinding and polishing machinery, it has become possible to compute and manufacture spectacles lenses in accordance with the individual data of a particular spectacles wearer. In addition to the usual prescription values, it is known to take into consideration parameters such as the interpupillary distance, the length of the eye, the pantoscopic angle, the lens curvature, the longitudinal or dioptic ametropia, the vertical and horizontal prisms and their divisions into right and left, the size and shape of a selected frame, the height of the centration point and the pupillary diameter as individual data when computing progressive lens surfaces.

When the achievement of a correct fitting of a spectacles frame which has been preliminarily selected by a particular spectacles wearer is to be included in an optimization of a pair of progressive-lens spectacles, it becomes necessary to measure spacings and fangles, of the preliminarily selected frame relative to the face of the spectacles wearer.

In the performance of the present invention it has been found that a bend which is present in a spectacles bridge and is accompanied by a tilting of the lens-mounting rims, strongly affects the astigmatism of oblique rays, so that the latter must be taken into account in an individual optimization of the pair of spectacles. For this it becomes necessary to measure an angle of tilt of the lens-mounting rims. The angle of tilt of the lens-mounting rims defines the lateral tilt of each lens-mounting rim located in front of an eye of a spectacles wearer.

BACKGROUND ART

For measuring the angle of tilt of a lens-mounting rim, i.e. the angle by which a single lens-mounting rim is tilted with respect to a horizontal tangent to the center of the bridge of a spectacles frame, no means of measurement have yet become known which would be suitable for measuring this specific angle. Measurement means described in the technical literature exclusively serve for measuring a bending of a frame.

A paper by Johannes Eber, entitled "Anatomische Brillenanpassung" (Anatomic Fitting of Spectacles), published by "Optische Fachveroeffentlichungen GmbH", Heidelberg, 1987, describes that a spectacles frame fitted with large lenses will be bent to a certain extent. This paper merely discusses the way of fitting the spectacles frame, but not the effect of the bending on the optical properties of the spectacles lenses.

BRIEF DESCRIPTION OF THE INVENTION

The present invention is based on the problem of providing a measuring instrument for establishing an angle by which each lens-mounting rim of a spectacles frame having two lens-mounting rims joined by a spectacles bridge is tilted in a horizontal plane in front of a respective eye of a spectacles wearer.

A measuring instrument in accordance with the invention comprises a supporting plate onto which a spectacles frame can be positioned with the upper or lower outside edges the lens-mounting rims downward. The supporting plate has a marking line on its surface along which the spectacles frame or a portion thereof may be aligned. Moreover, the instrument comprises at least one adjustable means permitting measurement of the angle between an imaginary line connecting a nasal edge and a temporal edge of a lens-mounting rim and the marking line.

BRIEF DESCRIPTION OF THE DRAWING

In the following the invention will be described by way of non-limiting examples with reference to the drawings, In the drawings:

FIGS. 1a and 1b are plan views of a first embodiment of the invention;

DETAILED DESCRIPTION OF THE PREFERRED EMBODIMENT

Figure 1C:
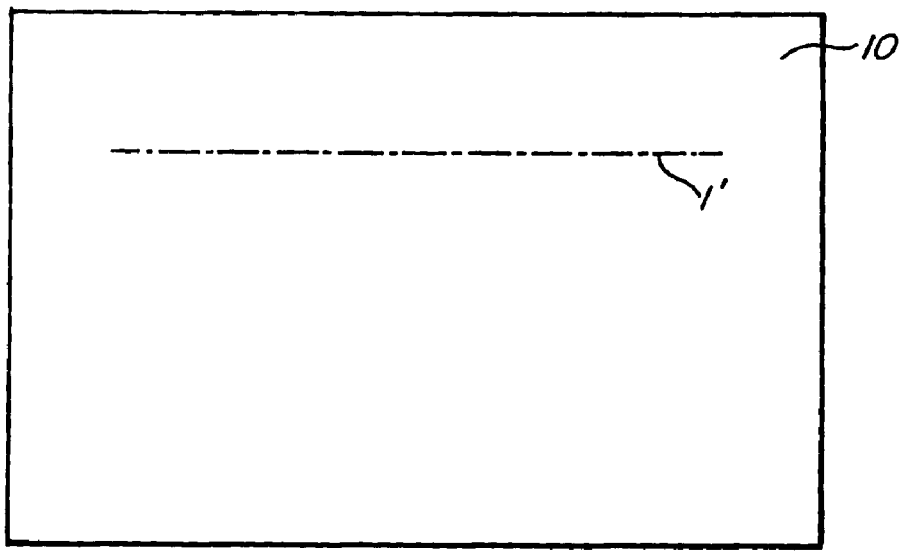
FIGS. 1c and 1d are plan views of a second embodiment of the invention.

FIGS 1a and 1b illustrate a first embodiment of an instrument for measuring a tilt of a lens ring in a horizontal plane on each side of a spectacles frame. A flat upper supporting plate 10 of a transparent material such as glass or a plastic has an upper surface bearing a marking line 1' along which a spectacles frame 3 may be positioned. The spectacles frame 3 has a left-hand lens-mounting rim 3' and a right-hand lens-mounting rim 3" joined by a spectacles frame bridge. In the illustrated case the spectacles frame 3 is positioned with the pivot axes of the hinges of each of the two temple bars of the spectacles frame vertically above the marking line 1', but other criteria for aligning the frame 3 with the marking line 1' may be applied.

The flat supporting plate 10 with the spectacles frame 3 positioned thereon is placed on a lower flat surface, such as that of a bottom plate bearing an elongate, for example curved, spectacles bridge mark 1", and a line of zero deviation (0°) extending along the lower surface on each side of the bridge mark 1" and tangentially to the apex of the curved bridge mark 1" or close and parallel thereto.

The lines of zero deviation on the left- and right-hand side of the spectacles bridge mark 1", as seen in FIG. 1a, each represent a zero angle of a fan of angles 2' and 2", respectively, that is also marked on the lower flat surface, each fan of angles 2' and 2" originating at a point on the respective line of zero deviation close to an end of the bridge mark 1" and extending outwards away from the bridge mark 1". The angles of each fan 2' and 2" are marked with numerals indicating angles of deviation from the respective line of zero deviation.

The upper supporting plate 1a with the spectacles frame 3 positioned thereon is initially placed on the lower flat surface with the spectacles bridge approximately above the spectacles bridge mark 1" which together with the two fans of angles 2' and 2" is visible through the transparent material of the upper supporting 1a, and the marking line 1' is positioned to be parallel to the line of zero deviation.

Next, the nasal edge of the left-hand lens-mounting rim 3' is positioned to be vertically above the origin of the fan of angles 2', with the marking line 1' being kept parallel to the lines of zero deviation. The angle of deviation of an imaginary line joining the nasal edge of the lens-mounting rim 3' with the temporal edge of the lens-mounting rim 3' from the respective line of zero deviation is read on the fan of angles 2' by visual observation of the area marked with the left-hand circle in FIG. 1b. This angle of deviation is the angle of tilt of the left-hand lens-mounting rim 3'.

In the same manner, by positioning the nasal edge of the right-hand lens-mounting rim 3" to be above the fan, of angles, 2" with the marking line 1' kept parallel to the lines of zero deviation, the angle of deviation of an imaginary line joining the nasal edge of the lens-mounting rim 3" with the temporal edge of the right-hand lens-mounting rim 3" from the respective line of zero deviation is read on the fan of angles 2" by visual observation of the area marked with the right-hand circle in FIG. 1b, giving the angle of tilt of the right-hand lens-mounting rim 3".

By visual observation as described above it is possible to attain an accuracy of measurement of approximately ±1°.

Figure 1D:
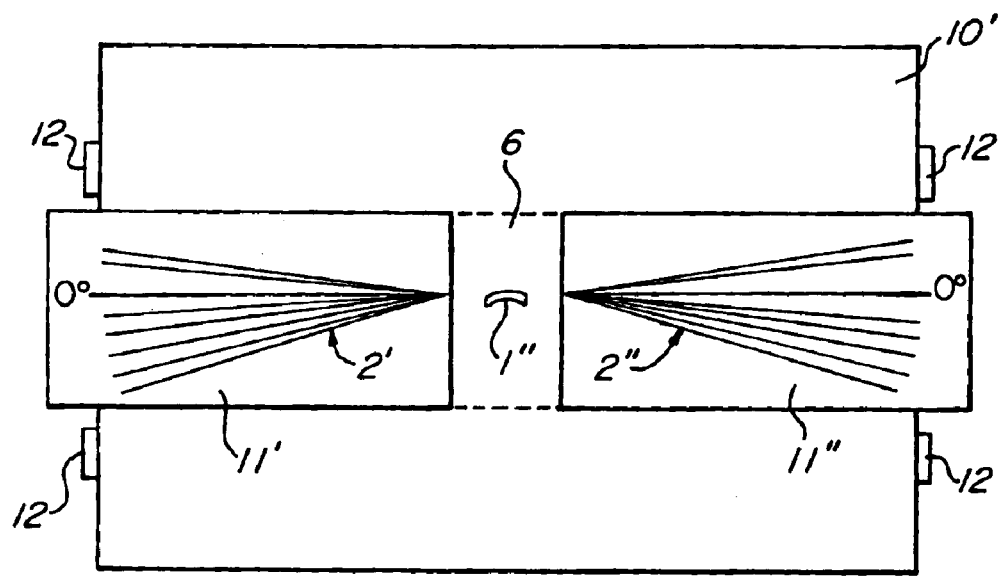

FIG. 1c and 1d are plan views of a second embodiment of the instrument which is used according to the same principle as the first embodiment, but permits greater convenience of handling FIG. 1c shows an upper transparent supporting plate 10 with a marking line 1' for orientation of a spectacles frame 3. FIG. 1d shows a bottom plate 10' having an upper surface serving as the lower flat surface used in the first embodiment.

A groove 6 of rectangular cross-section extends from left to right, as seen in FIG. 1d, laterally across the surface of the bottom plate 10'. Into the groove 6 are fitted two sliding members 11' and 11" adapted to slide along the groove 6 in the manner of a slide of a slide rule. The top, surfaces of the sliding members 11' and 11" are flush with the upper most surface of the bottom plate 1b. The top surface of each sliding member 11' and 11" is marked with a portion of a line of zero deviation and an outwardly extending fan of angles 2' and 2", respectively. The two lines of zero deviation are aligned with each other. A spectacles bridge mark 1" is located near the center of the bottom surface of the groove 6 and is visible when the sliding members 11' and 11" are disposed with their facing end faces separated from each other.

The supporting plate 10 shown in FIG. 1c may be positioned by sliding it along the surface of the bottom plate 10'. Preferably the supporting plate 10 and the bottom plate 10' are of similar size and shape, and guides 12 are provided at or close to the facing end faces of the bottom plate 10' to enable the supporting plate 10 to slide smoothly in a direction at right angles to the groove 6 whilst the marking line 1' on the supporting plate 10 remains parallel to the lines of zero deviation on the sliding members 11' and 11".

With this instrument it is possible, by sliding the supporting plate 10 with respect to the bottom plate 10' and by moving the sliding members 11' and 11" along the groove 6, to conveniently position the spectacles frame 3 with the nasal edge of the lens-mounting rim 3' vertically above the origin of the fan of angles 2', and the nasal edge of the lens-mounting rim 3" vertically above the origin of the fan of angles 2", whilst maintaining the marking line 1' parallel to the lines of zero deviation, so that the angles of deviation from the lines of zero deviation, as read on each of the fans of angles 2' and 2", are equal to the angles of deviation of the lens-mounting rims 3' and 3" from the marking line 1' and thus equal to the respective angles of tilt of the lens-mounting rims 3' and 3".

Figure 2A:
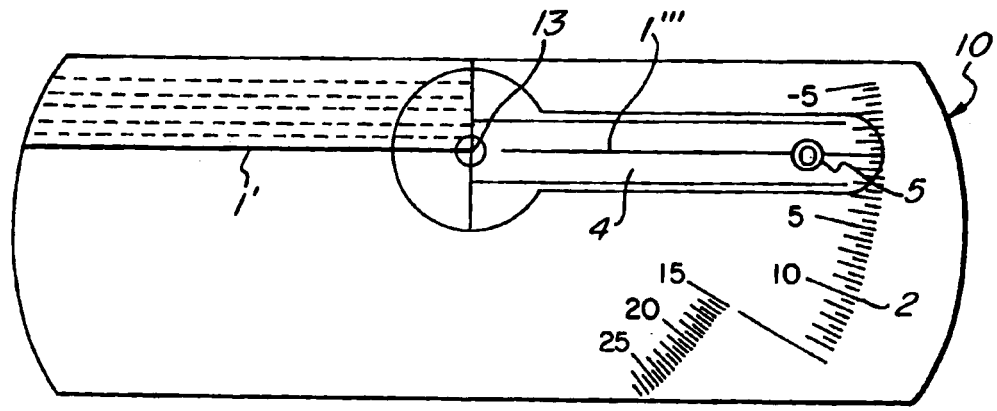
FIGS. 2a to 2c are plan views of a third embodiment of the invention.
Figure 2B:
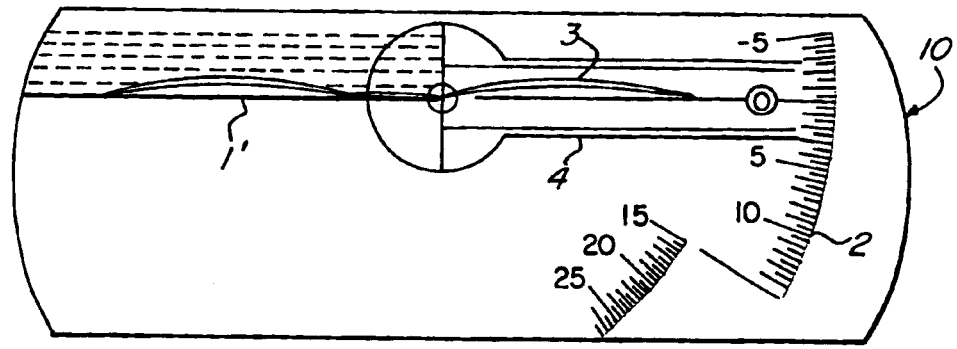
Figure 2C:
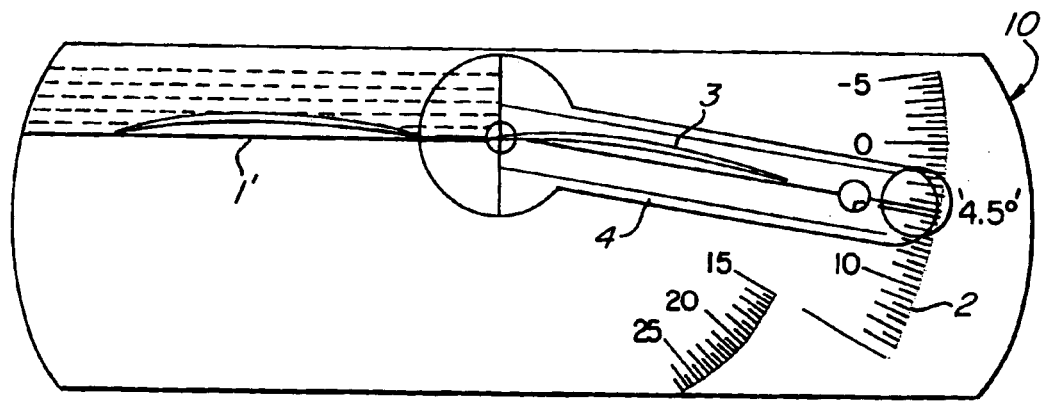

FIGS. 2a, 2b and 2c show a third embodiment of the invention in which a supporting plate 10 has an upper surface on which a spectacles frame 3 may be positioned with upper or lower outside edges of the lens-mounting rims of the frame 3 downward. The supporting plate 10 has a flat first upper surface portion for supporting a first lens-mounting rim, shown on the left-hand side, and a second upper surface portion. The first lens-mounting rim and a spectacles bridge of a spectacles frame 3 may be aligned along a first marking line 1' on the upper surface portion of the supporting plate 10. A pointer 4 is pivoted on an end of the first marking line 1' and adapted to be swiveled through a range of angles in a plane above that of the second upper surface portion. The upper surface of the pointer 4 is flat and adapted to support a second lens-mounting rim of the spectacles frame 3, as shown on the right-hand side in FIGS. 2b and 2c. The plane of the second upper surface portion may be below that of the first upper surface portion, so that the upper surface of the pointer 4 is in the same plane as that of the first upper surface portion. A second marking line 1'" extends along the flat upper pointer surface and is aligned with a pivot point 13 of the pointer 4. By moving the pointer 4 to a suitable position, the second marking line may be aligned with the second lens-mounting rim supported on the upper surface of the pointer 4. The second surface portion is marked with an angular scale which is associated with the pointer 4 and bears numeral markings which each indicate one-half of an angle of deviation of the second marking line from the first marking line.

Auxiliary marking lines (shown as dashed lines) may be provided at close spacings parallel to the marking line 1' for use in aligning the first lens mounting rim in case of a strong bend in the spectacles frame 3.

In a method of using the instrument, the spectacles frame 3 is positioned as shown in FIGS. 2b and 2c, where the first lens-mounting rim rests on the first upper surface portion of the supporting plate 1 with the temporal edge disposed above the first marking line 1', and the second lens-mounting rim rests on the pointer 4 with the nasal edge disposed above the pivot point 9 of the pointer 4 and the temporal edge disposed vertically above the second marking line on the pointer 4. The angle of deviation of the second marking line 1'" from the first marking line 1' is indicated by the position of the pointer 4 on the angular scale.

This method presupposes that an optician will correct a bent spectacles frame to fit as symmetrically as possible on the head of a spectacles wearer. A compromise is made, wherein only a bending of the entire spectacles frame is measured. The angular deviation of only one of the lens mounting rims in a horizontal plane with respect to the remainder of the spectacles frame is determined, i.e. whilst the other side of the spectacles frame is aligned along the zero direction, which means that it is aligned with a line joining the nasal and temporal side edges parallel to the marking line 1'. The angle of tilt of each of the single lens mounting rims is taken as being one-half of the angle of deviation as measured on the one lens mounting rim only.

FIG. 2b illustrates the case that a frame 3 having no tilt is placed on the supporting plate 1, and FIG. 2c illustrates the case that a bent or tilted frame 3 is placed on the supporting plate 1. It should be noted that the nasal side edge of the right-hand lens-mounting rim must be positioned above the origin or pivot point 13 of the pointer 4. As shown in this case, the angle of deviation of the pointer 4 is 9°. However, for the convenience of the optician performing the measurement, the scale indicates a tilt value of 4.5° which is taken to be an average value representing the tilt each of the lens-mounting rings.

What is claimed is:

1. Measuring instrument for establishing an angle by which each lens-mounting rim of a spectacles frame having two lens-mounting rims joined by a spectacles bridge is tilted in a horizontal plane, said instrument comprising: a flat supporting plate of a transparent material, having an upper surface on which said spectacles frame may be placed with upper or lower outside edges of said lens-mounting rims downward; a marking line on the upper surface of said supporting plate, along which the two lens-mounting rims and the spectacles bridge of said spectacles frame may be aligned; a bottom plate having a flat upper surface on which said supporting plate may be placed and positioned by sliding; said upper surface of said bottom plate bearing as markings: an elongate spectacles bridge mark having two ends and marking a position above which a spectacles bridge of the spectacles frame positioned on the upper supporting plate may be approximately disposed; a line of zero deviation extending outwards along from close to each end of the spectacles bridge mark for a length greater than a length of a lens-mounting rim of said spectacles frame, two fans of angles each originating close to one end of said spectacles-bridge mark and extending outwards in opposite directions for a length greater than that of a lens-mounting rim of said spectacles frame, each fan of angles including said line of zero deviation and covering a range of angles of deviation from said line of zero deviation, numerals indicating values of said angles of deviation, said marking line bearing a numeral indicating zero deviation.

2. Measuring instrument according to claim 1, wherein a groove of rectangular cross-section extends across the surface of the bottom plate in a lateral direction, said groove having said elongate spectacles bridge mark located near the center of a bottom surface of the groove to extend in the lateral direction; two rectangular sliding members are fitted into the groove and adapted to slide along the groove, the top surfaces of the sliding members being flush with the upper surface of the bottom plate; said sliding members are adapted to slide from a first position in which facing inner end faces of said sliding members contact each other to a second position in which said end faces are spaced from each other by a distance permitting the spectacles bridge mark to be visible; the top surface of each sliding member is marked with one of said outwardly extending fans of angles including said line of zero deviation and said numerals indicating values of said angles of deviation; each of said fans of angles having an origin close to the end face of the respective sliding member.

3. Measuring instrument according to claim 2, wherein the supporting plate and the bottom plate are of similar size and rectangular shape, and guides are provided at or close to lateral side edges of the bottom plate to enable the supporting plate to slide smoothly on the upper surface of the bottom plate in a direction at right angles to the groove whilst the marking line on the supporting plate remains parallel to the lines of zero deviation on the sliding members.

4. Measuring instrument for establishing an angle by which one lens-mounting rim of a spectacles frame having a first and a second lens-mounting rim joined by a spectacles bridge is tilted in a horizontal plane, said instrument comprising: a supporting plate adapted to receive said spectacles frame positioned thereon with upper or lower outside edges of said lens-mounting rims downward, said supporting plate having a first upper surface for supporting said first lens-mounting rim, and a second upper surface laterally adjacent said first upper surface; a first marking line on said first upper surface, along which said first lens-mounting rim and said spectacles bridge may be aligned; a pointer pivoted on an end of said first marking line and adapted to be swiveled in a plane above said second upper surface through a range of angles, said pointer having a flat upper pointer surface for supporting said second lens-mounting rim, a second marking line on said upper pointer surface, along which said second lens-mounting rim may be aligned, said second marking line being aligned with a pivot point of said pointer, an angular scale on said second surface portion, said angular scale being associated with said pointer to indicate an angle of deviation between said first marking line and said second marking line.

5. Measuring instrument according to claim 4, wherein the plane of the second upper surface of the supporting plate is below that of the first upper surface, so that the upper surface of the pointer is in the same plane as that of the first upper surface.

6. Measuring instrument according to claim 5, wherein auxiliary marking lines are provided at close spacings parallel to the first marking line.

7. Measuring instrument according to claim 4, wherein said pointer further comprises a magnifier for reading said angular scale.

8. Measuring instrument for establishing an angle by which one lens-mounting rim of a spectacles frame having a first and a second lens-mounting rim joined by a spectacles bridge is tilted in a horizontal plane, said instrument comprising: a supporting plate adapted to receive said spectacles frame positioned thereon with upper or lower outside edges of said lens-mounting rims downward, said supporting plate having a first upper surface for supporting said first lens-mounting rim, and a second upper surface laterally adjacent said first upper surface; a first marking line on said first upper surface, along which said first lens-mounting rim and said spectacles bridge may be aligned; a pointer pivoted on an end of said first marking line and adapted to be swiveled in a plane above said second upper surface through a range of angles, said pointer having a flat upper pointer surface for supporting said second lens-mounting rim, a second marking line on said upper pointer surface, along which said second lens-mounting rim may be aligned, said second marking line being aligned with a pivot point of said pointer, an angular scale on said second surface portion, said angular scale being associated with said pointer to indicate an angle of deviation between said first marking line and said second marking line, wherein said pointer is adapted such that said second lens-mounting rim rests on said pointer with a nasal edge of said second lens-mounting rim disposed above the pivot point of said pointer.

\* \* \* \* \*